(12) United States Patent
Cleper et al.

(10) Patent No.: US 11,908,287 B2
(45) Date of Patent: *Feb. 20, 2024

(54) IMAGING USED TO RECONCILE CART WEIGHT DISCREPANCY

(71) Applicant: SUPERSMART LTD., Rosh HaAyin (IL)

(72) Inventors: Yair Cleper, Petah Tikva (IL); Barak Abitbol, Tzur Yitzhak (IL); Elad Dan, Tel Aviv (IL); Zeev Shtainmetz, Petah Tikva (IL); Vlad Streltsin, Kfar Yona (IL)

(73) Assignee: SUPERSMART LTD., Rosh HaAyin (IL)

( * ) Notice: Subject to any disclaimer, the term of this patent is extended or adjusted under 35 U.S.C. 154(b) by 473 days.

This patent is subject to a terminal disclaimer.

(21) Appl. No.: 17/284,808

(22) PCT Filed: Oct. 17, 2019

(86) PCT No.: PCT/IB2019/058884
§ 371 (c)(1),
(2) Date: Apr. 13, 2021

(87) PCT Pub. No.: WO2020/079651
PCT Pub. Date: Apr. 23, 2020

(65) Prior Publication Data
US 2022/0005327 A1    Jan. 6, 2022

Related U.S. Application Data

(60) Provisional application No. 62/746,634, filed on Oct. 17, 2018.

(51) Int. Cl.
*G07G 1/00* (2006.01)
*G06K 7/14* (2006.01)
(Continued)

(52) U.S. Cl.
CPC ......... *G07G 1/0072* (2013.01); *G06K 7/1413* (2013.01); *G06K 7/1417* (2013.01); *G06Q 20/18* (2013.01); *G06Q 30/018* (2013.01)

(58) Field of Classification Search
CPC .. G07G 1/0072; G07G 1/0081; G06K 7/1413; G06K 7/1417; G06Q 20/18; G06Q 30/018
See application file for complete search history.

(56) References Cited

U.S. PATENT DOCUMENTS 7,246,745 B2 * 7/2007 Hudnut .................. A47F 9/046
235/383
10,552,814 B2 * 2/2020 Volta .................... G07G 1/0054
(Continued)

FOREIGN PATENT DOCUMENTS

CN    108320404 A    7/2018

OTHER PUBLICATIONS

Office Action in related EP patent application 19794664.3, dated Nov. 8, 2022.
International Search Report. 3 pages. dated Dec. 17, 2019.

*Primary Examiner* — Michael Jared Walker
(74) *Attorney, Agent, or Firm* — Nathan & Associates; Menachem Nathan

(57) ABSTRACT

Disclosed embodiments provide transaction validation systems and methods for use in self-checkout at a retail establishment. An exemplary system may include a scale sized to support and weigh a shopping basket thereon. At least one image sensor is arranged to capture at least one image of the weighed shopping basket. A processor receives a weight measurement of the shopping basket from the scale and determines, based on information received from a wireless communications device of a customer, a record of products in the shopping basket and an expected cumulative weight associated with the products in the shopping basket. The (Continued)

processor determines a discrepancy between the weight measurement of the products in the shopping basket and the expected cumulative weight and reconciles the determined discrepancy using the at least one captured image of the shopping basket by the at least one image sensor.

20 Claims, 8 Drawing Sheets

(51) Int. Cl.
*G06Q 20/18* (2012.01)
*G06Q 30/018* (2023.01)

(56) References Cited

U.S. PATENT DOCUMENTS

| | | | | |
|---|---|---|---|---|
| 2006/0261157 | A1* | 11/2006 | Ostrowski | G06V 20/68 235/383 |
| 2011/0295704 | A1* | 12/2011 | Edwards | G07G 1/0054 705/16 |
| 2014/0214577 | A1* | 7/2014 | Acker, Jr. | G01G 19/12 705/23 |
| 2014/0214596 | A1* | 7/2014 | Acker, Jr. | G06Q 30/0633 705/26.8 |
| 2015/0006319 | A1* | 1/2015 | Thomas | G06Q 30/0633 705/26.8 |
| 2015/0029339 | A1* | 1/2015 | Kobres | H04N 7/181 348/150 |
| 2015/0039458 | A1* | 2/2015 | Reid | A61B 5/117 705/26.1 |
| 2015/0095189 | A1* | 4/2015 | Dharssi | G06V 10/56 705/26.8 |
| 2016/0110703 | A1* | 4/2016 | Herring | G06Q 20/18 705/23 |
| 2018/0225534 | A1* | 8/2018 | Sawada | G07G 1/0072 |
| 2018/0253604 | A1* | 9/2018 | Hiramatsu | G06V 20/52 |
| 2019/0118844 | A1* | 4/2019 | Li | G07G 1/0081 |

\* cited by examiner

IMAGING USED TO RECONCILE CART WEIGHT DISCREPANCY

CROSS REFERENCE TO RELATED APPLICATIONS

This is a 371 application from international patent application PCT/IB2019/058884, which claims the benefit of priority of U.S. Provisional Patent Application No. 62/746,634, filed Oct. 17, 2018, which is incorporated herein by reference in its entirety.

BACKGROUND

Technical Field

The present disclosure relates to the field of retail store self-checkout. In particular, it relates to technology that enables customers to select and purchase products without, or with reduced, human intervention in the check-out process.

Background Information

Self-checkout machines at retail stores allow customers to process their own purchases at a retail store as an alternative to purchasing items with the intervention of a human cashier. Essentially, self-checkout allows the customer to perform the tasks of a cashier. In other words, it enables customers to scan their own items and expedite a payment process.

Self-checkout lanes provide a variety of advantages for the retail industry. For the customer, self-checkout lanes provide a quicker alternative to going through a cashier lane and do not require the customer to interact with a cashier. Implementing this convenient method of checkout may also reduce the length of checkout lines in retail stores as well as wait times. Further, self-checkout lanes provide a large benefit to the retailer by greatly reducing labor costs. For example, one self-checkout attendant may be able to supervise several self-checkout lanes, whereas a cashier can only operate one traditional checkout lane. Additionally, self-checkout machines are much smaller than traditional checkout lanes, and thus can save the retailer space in its store for other purposes (e.g., shelves, display cabinets, additional self-checkout lanes, etc.).

There may, however, be some disadvantages associated with self-checkout lanes. for example, due to reduced interaction between customers and retail staff, staff members may be unable to confirm that all of the customer is charged for all of the products they intended to buy, and the customer might overlook a product or forget to scan it. Additionally, some customers may take advantage of the reduced supervision of self-checkout lanes and use it as an opportunity to shoplift intentionally. Some customers may also opt out of using self-checkout lanes because they find the scanning their own products is cumbersome.

Therefore, there is a demand in retail establishments for a self-checkout system that may efficiently and effectively validate transactions between customers and the retail establishment and do so with minimal effort from the customer.

SUMMARY

Consistent with the present disclosure, a transaction validation system for use in self-checkout at a retail establishment is disclosed. The system may include: a scale sized to support and weigh a shopping basket thereon; at least one image sensor arranged to capture at least one image of the weighed shopping basket in a vicinity of the scale; at least one processor configured to: receive from the scale a weight measurement of the shopping basket; determine, based on information received from a wireless communications device of a customer, a record of products in the shopping basket and an expected cumulative weight associated with the products in the shopping basket; determine a discrepancy between the weight measurement of the products in the shopping basket and the expected cumulative weight; and reconcile the determined discrepancy using the at least one captured image of the shopping basket by the at least one image sensor.

A non-transitory computer readable medium containing instructions for use self-checkout at a retail establishment, the computer readable medium containing instructions that when executed by a processor cause the processor to perform a method, the method comprising: receiving, from a scale, a weight measurement of a shopping basket; determining, based on information received from a wireless communications device of a customer, a record of products in the shopping basket and an expected cumulative weight associated with the products in the shopping basket; determine a discrepancy between the weight measurement of the shopping basket and the expected cumulative weight; receiving, from an image sensor in a vicinity of the scale at least one image of the shopping basket; performing an image analysis on the at least one image to determine products in the shopping basket; and reconciling the determined discrepancy using the determined products in the at least one captured image of the shopping basket by identifying in the at least one captured image at least one product missing from the record; and updating the record with the at least one missing product.

The foregoing is simply a summary of a few aspects of the disclosure and is not intended to be in any way limiting of the claims or the other inventive concepts described herein. It is to be understood that both the foregoing general description and the following detailed description are exemplary and explanatory only, and are not restrictive of the disclosed embodiments, as claimed.

DETAILED DESCRIPTION

Reference will now be made in detail to exemplary embodiments, examples of which are illustrated in the accompanying drawings and disclosed herein. Wherever convenient, the same reference numbers are used throughout the drawings to refer to the same or like parts. As described in further detail herein, some of the disclosed embodiments are directed to using imaging to reconcile cart weight discrepancy.

Consistent with the present disclosure, a transaction validation system for use in self-checkout at a retail establishment is disclosed. In some embodiments, the system may include a self-checkout lane that may enable a customer to quickly check out without requiring the customer to remove products from a shopping basket, particularly when no irregularities are detected. As the customer shops, an electronic record is made of the products that are placed in the customer's shopping basket. This can occur in one of many ways, including through the use of a hand-held scanner provided by the retail establishment, through the customer's mobile communications device, through a scanner or image sensor mounted on the shopping basket, or through one or more image sensors arranged throughout the retail establishment. Once in the checkout lane, the customer's shopping basket may be positioned on a scale with at least one image sensor arranged to capture an image of the products inside of the shopping basket. At least one processor associated with the system may use the output of the scale and the at least one image sensor to confirm whether the record of products in the shopping basket is correct.

The term "checkout lane" lane is used herein in a broad sense. A checkout lane can resemble a traditional checkout aisle in a store or retail establishment, or it can simply be a location in the store where checkout occurs. Any location where cart contents can be verified and/or reconciled is considered a "checkout lane" in accordance with this disclosure. Similarly, this disclosure refers in some instances to a shopping basket and in other instances to a shopping cart. While a shopping cart tends to suggest a large four wheeled trolley and a basket may tend to suggest a smaller liftable container, the term basket is often used synonymously herein to refer to both. For purposes of interpreting the breadth of this disclosure, the terms "basket" and "cart" should be interpreted synonymously.

Figure 1:
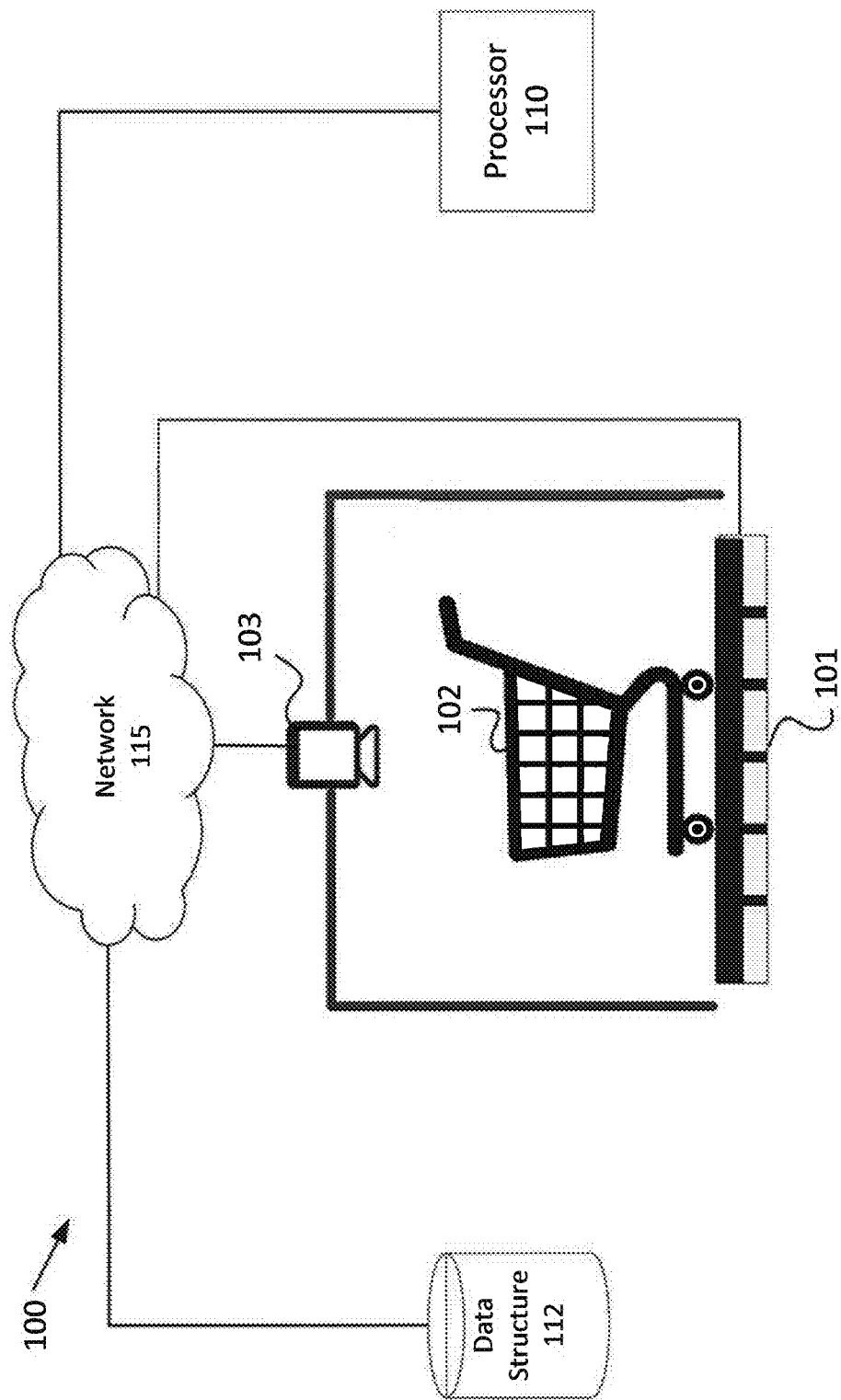
FIG. 1 is a diagram illustrating an exemplary configuration of one embodiment of the disclosed systems.

FIG. 1 provides a general illustration of the components of one exemplary embodiment, consistent with the present disclosure. For example, system 100 may include scale 101, upon which a shopping basket 102 may be positioned, at least one image sensor 103, and at least one processor 110. These components may be communicatively coupled through network 115, however, they may also be communicatively coupled in any other way, such as through hardware integrated in a point of sale (POS) unit in the checkout lane, for example. Data structure 112 may also be a part of system 100 and may maintain records that may be necessary for the at least one processor 110 to perform related functions.

The components described above do not necessarily need to be located or perform their functions at the same location. For example, a data structure or an at least one processor may be located or based in a location remote from the retail establishment. For example, a third party service provider may maintain custody over the data structure 112 while the checkout lanes may be located remotely in a retail establishment. In some embodiments, the at least one image sensor is located in a store, and the at least one processor is configured to determine a discrepancy from a central location remote from the store, where the at least one processor in the central location is adapted to determine discrepancies from a plurality of stores. For example, a retail company may have a plurality of retail establishments (e.g., grocery stores) across a large geographic area, but may use the disclosed systems and methods through the use of at least one processor located at one or more facilities dedicated to facilitating the discrepancy determination and reconciliation process.

Figure 2:
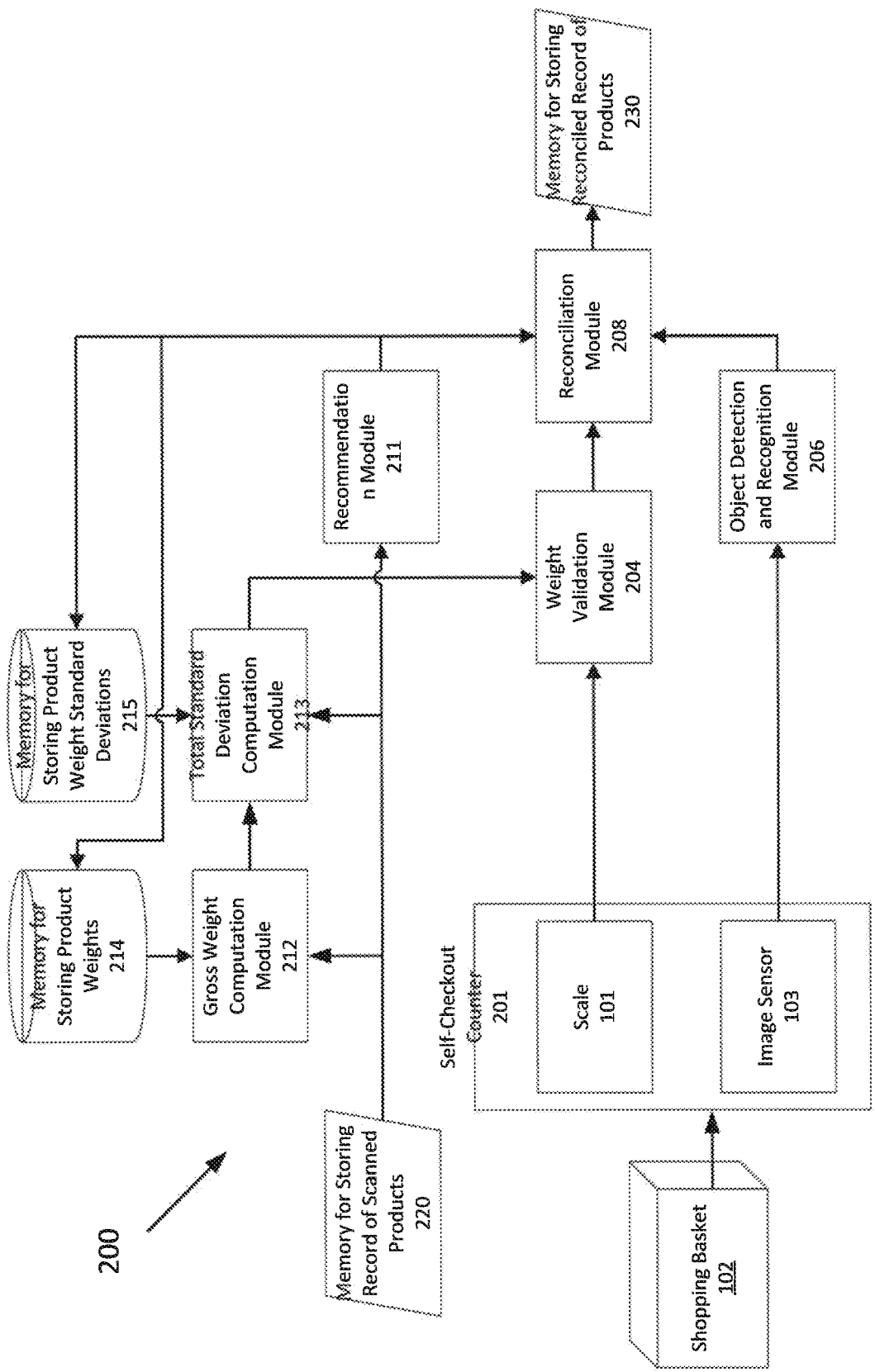
FIG. 2 is a system diagram of an exemplary system consistent with disclosed embodiments.

Consistent with the present disclosure and with reference to FIG. 1, FIG. 2 provides a system diagram illustrating data flow in an exemplary transaction validation system 200 for reconciling detected discrepancies between the weight measurement of the products in the shopping basket and the expected cumulative weight. The process may begin with shopping basket 102, which may contain at least one product. During their collection, each product may be recorded in memory 220 for storing a record of scanned products The memory 220 may, for example, may be contained within a wireless communication device, for communicating the record to the system. Shopping basket 102 may be placed on scale 101 associated with self-checkout counter 201, which may have an image sensor 103 positioned to capture at least one image of the contents of basket 102. Once image sensor 103 has captured the at least one image, object detection and recognition module 206 may perform image recognition on each image to identify the products in the image. Scale 101 may measure a weight of basket 102 and its contents and sent to weight validation module 204. Object detection may occur through analysis of individual images or a plurality of images. For example, the image sensor may capture video, and analysis may be performed on one or more of the video images. Alternatively, the image sensor may capture still images, and analysis may be performed on one or more of the still images. Of course, if multiple image sensors are employed, an analysis of shopping basket contents may result from an aggregate analysis of one or more images from one or more differing image sensors. In some installations embodiments disclosed herein can be implemented through addition of new checkout lane hardware, or may be implemented by incorporating elements of the disclosed embodiments and/or enabling software within preexisting self-checkout systems.

In series or in parallel, the record obtained from memory 220 may be sent to recommendation module 211 and perform Gross Weight Computation module 212, in which the weight of the products in the basket may be calculated. The output of Gross Weight Computation Module 212 may be fed to Total Standard Deviation Computation Module, which itself receives standard product weight deviations from module 215. The weight outputs, may then be sent to Weight Validation Module 204, which holds the expected weight of the basket contents, along with the expected variation. The product weights stored in memory 214 and the product weight standard deviations stored in memory 215 may be recorded in advance and may be maintained within a data structure associated with system 200. Memory 220 may also convey to the recommendation module an ID code associated with the shopping basket 102. The empty weight of shopping basket 102 may be prerecorded and stored in memory 214. Alternatively, a separate sensor may be provided at the checkout lane for reading an ID code on the shopping basket to enable a look up of the weight of the shopping basket. Although illustrated as separate memories for ease of discussion, memories 214 and 215 may be combined either together or with one or more other memories in the system. Thus the weights of the products, the deviations, and the shopping basket weights can be stored together or separately. In some embodiments, the product weight standard deviation and standard deviation computation may be omitted and the system may operate without the related structures.

Weight validation module 204 may determine and/or store an expected weight of shopping cart 102 and its contents and compare the expected weight with the actual weight outputted by scale 101. Weight validation module 204 may determine that the expected weight and the actual weight are inconsistent with one another, thereby indicating an existing discrepancy requiring reconciliation using optical imaging of the shopping basket. To this end, image sensor 103 may record at least one image of the shopping basket and send associated image information to Object Detection and Recognition Module 206. Module 206 may use image recognition techniques to identify particular products in the shopping basket. The outputs of weight validation module 204, object detection and recognition module 206, and recommendation module 211 may be received by reconciliation module 208, which may seek to ascertain a reason for the discrepancy determined in the Weight Validation Module 204. For example, the Object Detection and Recognition Module 206 may identify a soft drink bottle that was not in the record of scanned products. If so, it may then query memories 214 and perhaps 215 to determine the weight of the bottle and add it to the cart weight, after which the Reconciliation Module may determine that the discrepancy is reconciled. Once reconciled, the system may output to Memory 230 a reconciled record of the scanned products.

FIG. 2 uses the term "Module" broadly for ease of discussion. As used in FIG. 2, a module could be a separate piece of hardware, or could be lines of code run by one or more processors. The modules therefore might all be collocated in a single piece of software run by a single or multiple processors, or might be spread across multiple pieces of software and run by separate processors or a same group of processors. Moreover, although discussed as separate modules, the functionalities of the modules may be combined such that specific modules do not necessarily exist as standalone, identified entities. For example, product weight and expected deviation could be stored in a single memory and could be calculated together in a single section of script. Recommendation Module 211 might be omitted altogether, with Reconciliation Module 208 being fed directly from Memory 220. Similarly, the weight calculations may be supplied directly to Reconciliation Module 208 without a separate Weight Validation Module 201. These are only examples of expected system variations consistent with this disclosure. Thus, FIG. 2 is to be understood as providing a purely exemplary overview of the system functionality without limiting the disclosure in its broadest sense to a particular system structure.

Consistent with the present disclosure, a system and method may include a scale sized to support and weigh a shopping basket thereon. Consistent with disclosed embodiments, a "scale" may constitute any physical device or group of devices capable of weighing an item exerting a force thereon. A scale may be a mechanical scale (e.g., a spring scale or a hydraulic/pneumatic scale), a digital scale (e.g., scales utilizing strain gauges, load cells, etc.), or any other device that is suitable for measuring a gravitational force, or weight, of an object exerting a force thereon.

Consistent with disclosed embodiments, a scale may be sized to support and weigh any individual or group of items with or without a shopping basket. A "shopping basket," as used herein, may be any suitable container for holding items selected for purchase in a store. A shopping basket may include, but is not limited to, a handheld basket, a pushed shopping cart, a reusable shopping bag, a non-reusable shopping bag, a wheeled tote, or any other alternative container way for holding or presenting items selected for purchase.

Figure 3A:
FIG. 3A is an illustration of an exemplary embodiment of scales consistent with the disclosed embodiments.

The scale may be sized to support the shopping basket based on the type or size of the shopping basket to be used with the system. For example, in systems that employ shopping carts, the scale may be located in or on a floor of a checkout lane. (See, FIGS. 3B and 3C). In systems that employ hand-held baskets, the scale may be located in or on a counter.

Consistent with the present disclosure, a "scale" may also constitute a plurality of scales used together to measure the weight of the shopping basket. For example, a scale on or in the floor may contain two weighing components—one for the front wheels and one for the back wheels (not illustrated); or one for the right side wheels and one for the left side wheels (not illustrated). In some embodiments, the scale may be incorporated directly into the cart, by associating strain gauges with each of the wheels, as illustrated by scales 101 associated with the wheels of the shopping basket in FIG. 3A. If multiple weighing components are used, the system may calculate the cart weight by aggregating weights measured by each component. If strain gauges or scales incorporated into the wheels of the shopping basket, those strain gauges may be configured with a transmitter to wirelessly send weight signals to the system for analysis.

Consistent with the present disclosure, the system may include a ramp for guiding the shopping basket onto the scale. If a retail establishment were to retrofit its checkout lanes with an automated weighing system, the new checkout lanes may have an elevated scale integrated into a platform with opposing ramps. Advantageously, the inclusion of ramps in the system may allow installation of the disclosed systems with above-ground, reducing cost of installation because portions of the floor would not have to be removed to accommodate the scale. For example, the scale may be integrated into a platform having an upper surface configured to be elevated from the floor of the retail establishment. The ramp may be positioned in a way so that ramp and the at least one image sensor are coordinately arranged such that when the shopping basket is positioned on the scale beyond the ramp, a top view camera is located above the shopping basket. In some embodiments, there may be a pair of ramps that may be configured or positioned to extend between the floor and the upper surface of the platform on opposing sides of the scale. An example, of a pair of ramps 301 is illustrated in FIG. 3B.

Consistent with disclosed embodiments, a system may include at least one image sensor arranged capture at least one image of the weighed shopping basket in a vicinity of the scale. The "at least one image sensor" may include, for example, at least one of a camera, spectrometer, infrared sensor, radio-frequency identification (RFID) sensor, and/or any other suitable sensor that is configured and operative for gaining information about the product items placed in a shopping basket and/or about the shopping basket itself. The at least one image sensor may be arranged to capture at least one image of the weighed shopping basket in a vicinity of the scale. The image sensors may be arranged, for example, above the scale so as to enable capture of a top view of the products in the basket and/or the basket itself. Additionally or alternatively, one or more image sensors may be arranged to the side of or below a shopping basket so as to enable image capture from related perspectives. Representations of potential configurations of the at least one image sensors can be found in FIGS. 4A, 4B, 4C, 4D, and 4E. It will be appreciated that these Figures are exemplary only, and do not limit the scope of the present disclosure to the configurations displayed therein.

Figure 3B:
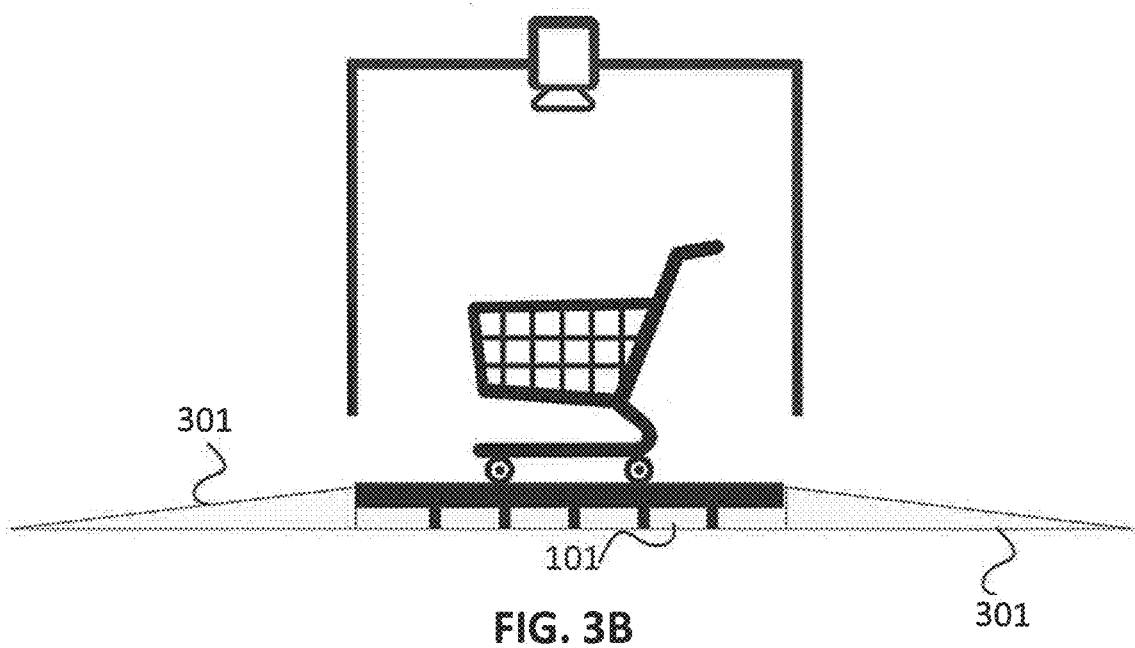
FIG. 3B is an illustration of another exemplary embodiment of scales consistent with the disclosed embodiments.
Figure 3C:
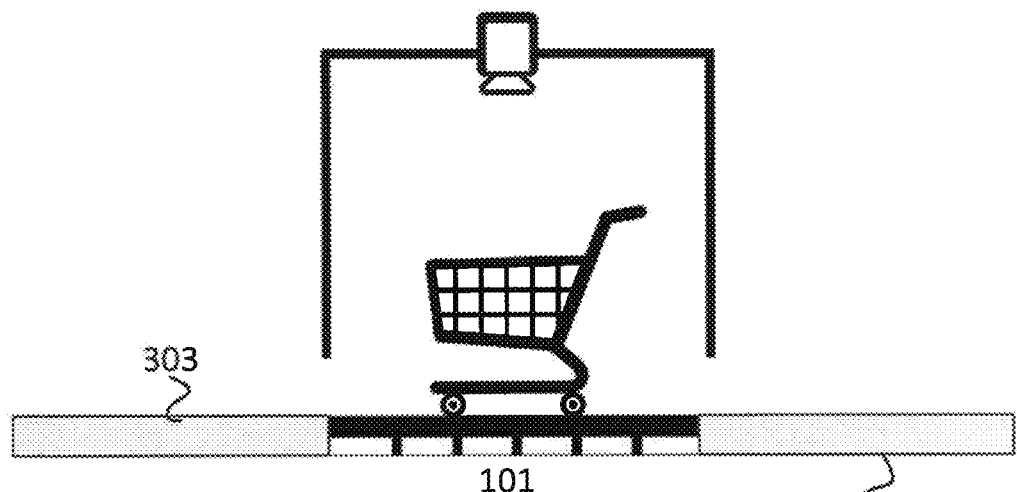
FIG. 3C is an illustration of another exemplary embodiment of scales consistent with the disclosed embodiments.
Figure 3D:
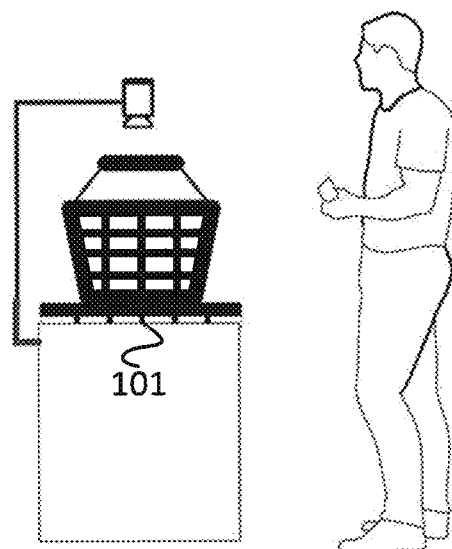
FIG. 3D is an illustration of another exemplary embodiment of scales consistent with the disclosed embodiments.
Figure 4A:
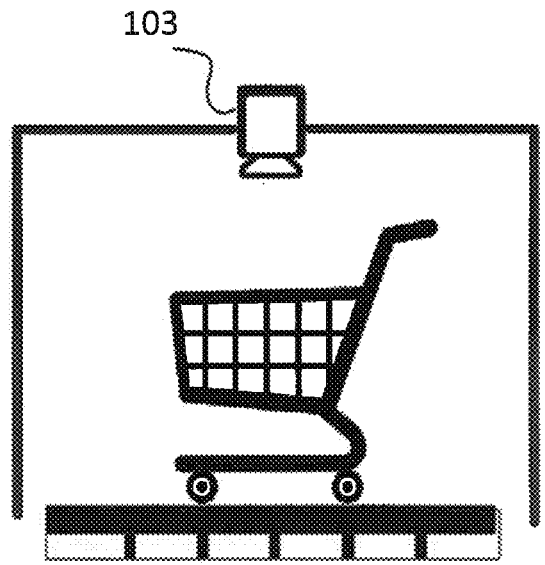
FIG. 4A is an illustration of an exemplary embodiment of an image sensor placement, consistent with disclosed embodiments.
Figure 4B:
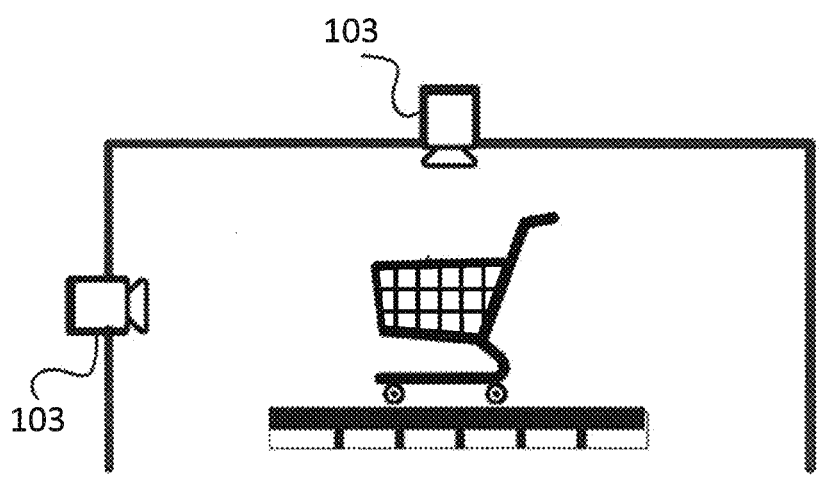
FIG. 4B is an illustration of another exemplary embodiment of an image sensor placement, consistent with disclosed embodiments.
Figure 4C:
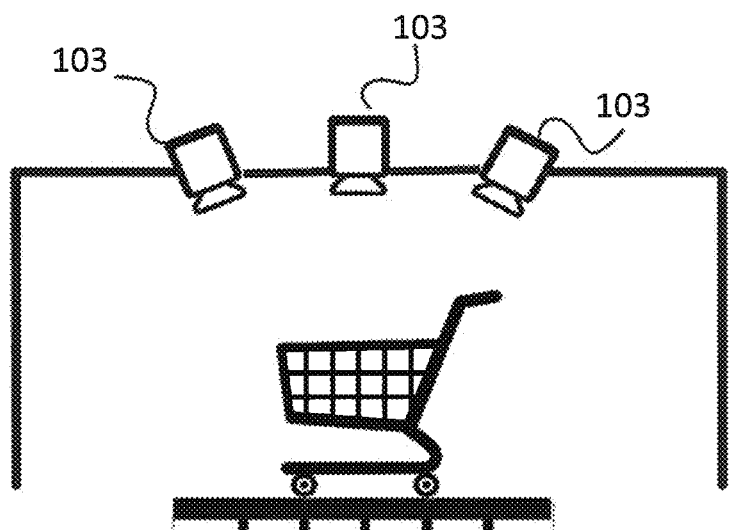
FIG. 4C is an illustration of another exemplary embodiment of an image sensor placement, consistent with disclosed embodiments.
Figure 4D:
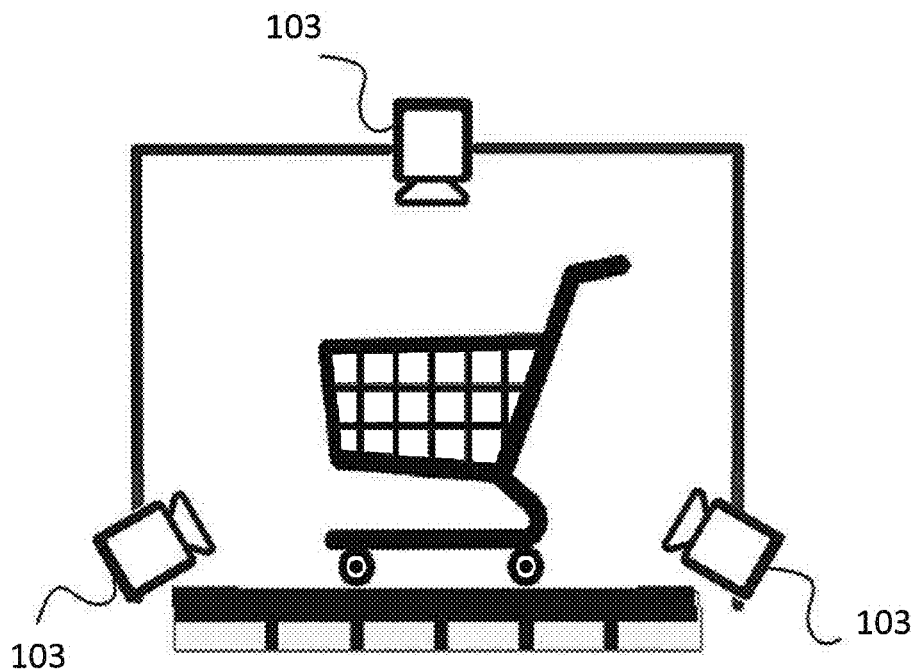
FIG. 4D is an illustration of another exemplary embodiment of an image sensor placement, consistent with disclosed embodiments.
Figure 4E:
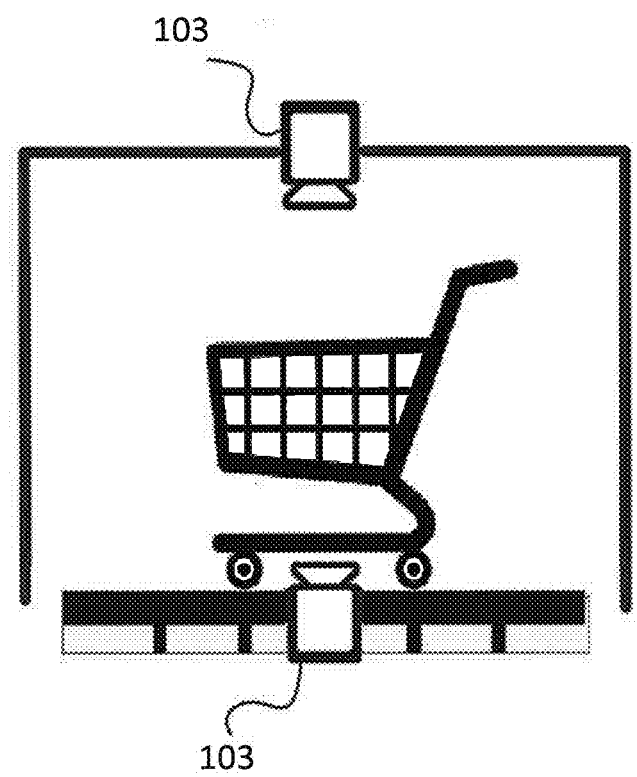
FIG. 4E is an illustration of another exemplary embodiment of an image sensor placement, consistent with disclosed embodiments.

In order to ensure proper image capture of the basket, the rightmost ramp in FIG. 3B may be positioned relative to image sensor 103 [303 refers to the floor to an image] such that when the shopping basket 102 is pushed beyond the rightmost ramp and before reaching the leftmost ramp, the shopping basket 102 is positioned beneath image sensor 103. This ensures that the weighed shopping basket is also scanned.

In some embodiments, multiple image sensors may be employed in a checkout lane to capture images of shopping cart contents from various angles or vantage points, and to use the combined image data to reconstruct images of products in the shopping cart. This may include, for example, controlling at least one image sensor positioned adjacent a checkout lane in a retail establishment. Controlling the at least one image sensor may be done automatically by the system and may include controlling the image sensor to capture images during certain time intervals. The time intervals may correspond, for example, to a period of time that the shopping basket is on or near the scale. Further, there may be multiple image sensors either controlled separately or in tandem. Multiple image sensors may be advantageous when products are occluded or partially occluded (or otherwise obfuscated) in the field of view one or more of the images sensors, which may be compensated for by other image sensors without an obfuscated field of view. The different images sensors may capture a plurality of images that may be aggregated to generate composite data for products in the shopping basket. Aggregating the plurality of images might include stitching the images together. For example, a plurality of captured images with overlapping views may be combined to produce a composite image. Capturing a product with multiple image sensors may also increase resolution and aid in product identification. By comparing the generated aggregate composite data with prestored product identities, the at least one processor may identify the products in the shopping basket based on the captured images and the comparison. Pre stored product identities may be stored on a storewide index of products available for sale, and/or may be stored on a data storage accessible by the system.

Generation of the storewide index may occur using a software module and camera system that permits capture of weight and images of an inventory. To facilitate image capture, the index-building software may be employed in checkout lanes for use during an initiation period where each product in the inventory is imaged from various angles and weighed. The bar code on the product may be used to associate the product images and weights with a preexisting inventory list. Alternatively, dedicated hardware may be used, with a camera system enabling 360 degree product views for initially capturing product images.

Consistent with disclosed embodiments, a system may also include at least one processor. "At least one processor" may constitute any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, system may also involve a network. A "network" may constitute any type of computer networking arrangement used to exchange data. For example, a network may be the Internet, a private data network, a virtual private network using a public network, a Wi-Fi network, a LAN or WAN network, and/or other suitable connections that may enable information exchange among various components of the system. A network may also include a public switched telephone network ("PSTN") and/or a wireless cellular network. A network may be a secured network or unsecured network. In other embodiments, one or more components of the system may communicate directly through a dedicated communication link(s). An example of a network 115 is illustrated in FIG. 1. Additionally or alternatively, network 115 may include a direct communication network. Direct communications may use any suitable technologies, including, for example, BLUETOOTH™, BLUETOOTH LE™ (BLE), Wi-Fi, near field communications (NFC), or other suitable communication methods that provide a medium for transmitting data between separate devices. In certain embodiments, a device associated with a customer and/or a merchant may connect and communicate with the system through a direct communications network.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Figure 5:
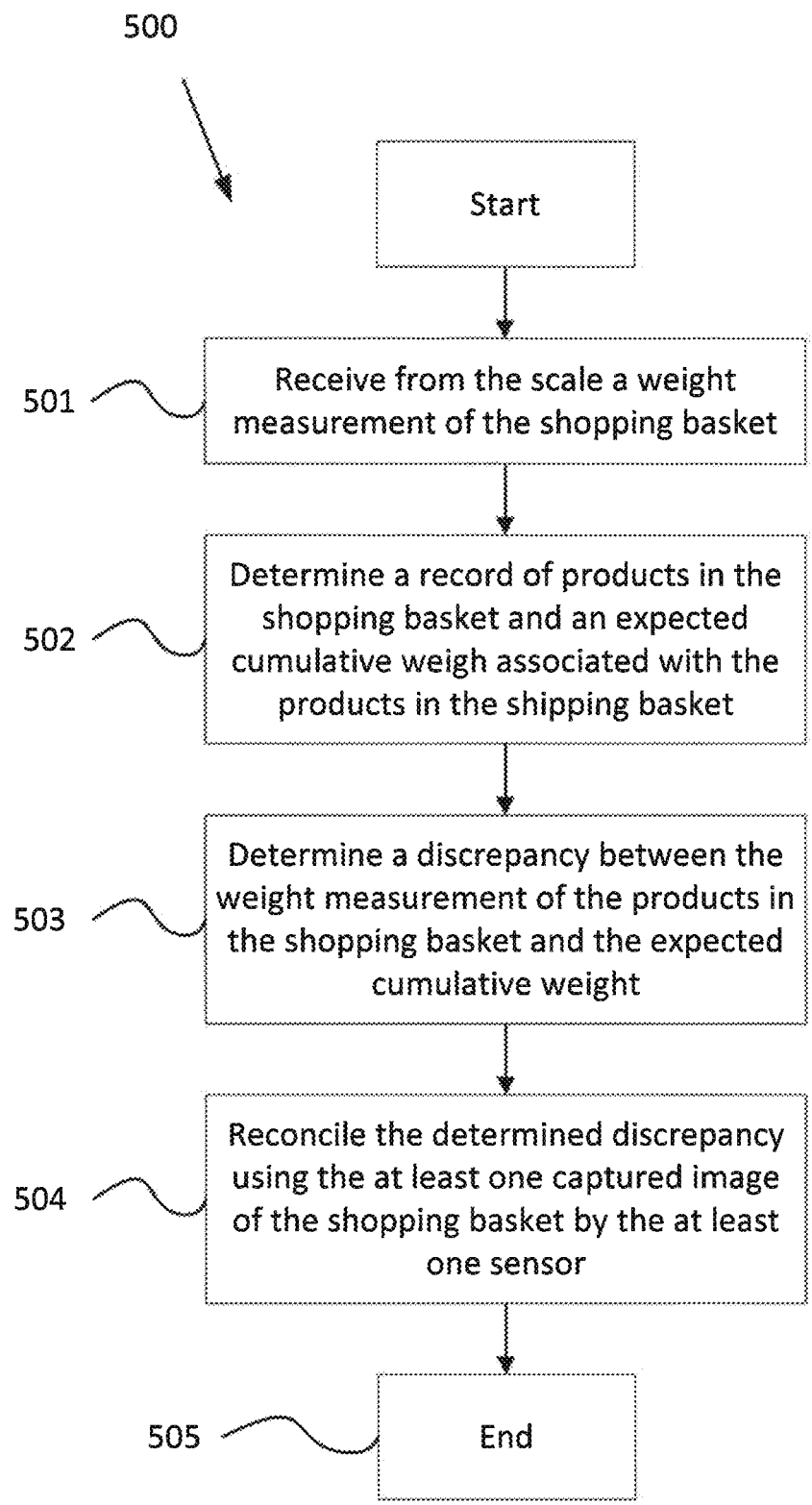
FIG. 5 is a flow chart illustrating an exemplary process of how an embodiment of the disclosed systems may determine and reconcile a discrepancy.

FIG. 5 provides is a flow chart illustrating an exemplary process 500 of how one embodiment of the disclosed systems may determine and reconcile a discrepancy. FIG. 5 provides a single example, for discussion purposes to aid in understanding broader principles of the inventions described herein. It is to be understood that the example of FIG. 5 is provided for illustrative purposes only and is not to be construed as exclusive or requiring a specific order of steps.

Consistent with the present disclosure, the at least one processor may be configured to receive from the scale a weight measurement of the shopping basket. This may occur, for example, at step 501 of process 500. The at least processor may be configured to communicate with the scale by way of a direct wired connection to the scale, or it may be configured to receive the weight measurement wirelessly through any suitable means of wireless communication. For example, the at least one processor may be integrated in the scale itself and may be configured to communicate with the scale through a wired connection. Additionally or alternatively, the at least one processor may be located remotely at, for example, a centralized server associated with the retail store, and may communicate wirelessly with the scale through BLUETOOTH™, BLUETOOTH LE™ (BLE), Wi-Fi, near field communications (NFC), or any other suitable means of wireless communication.

The weight measurement detected by the scale may include an aggregate weight of the cart and its contents. Determining the aggregate weight of the cart contents requires cart-weight subtraction, as will be discussed later.

Consistent with the disclosed embodiments, the at least one processor may be configured to determine, based on information received from a wireless communications device of a customer, a record of products in the shopping basket and an expected cumulative weight associated with the products in the shopping basket. A wireless communications device of a customer may be any suitable communications device that may transmit signals including information to the at least one processor. For example, the wireless communications device of the customer may be a cell phone of the customer, wearable technology of the customer (e.g., electronic glasses, wearable camera or other portable image sensor), a wireless communication device that is mounted on a shopping basket of the customer, a handheld scanner provided to the customer by the retail establishment for use during a shopping session, or any other device used by the customer to track the items placed in the customer's shopping basket. Alternatively, images may be captured by cameras throughout the store. For example, cameras in shopping aisles may record products placed in a basket by a customer. In such instances, the storewide cameras may be wired or wireless. The information transmitted by wired or wireless communications devices may, for example, include one or more of a customer identifier, a shopping basket identifier, a record of products that have been placed in the shopping basket, information on products held by or considered by the customer, or any other information about the shopping experience.

Other embodiments may also involve validating a shopping basket without any a-priory knowledge of the basket contents. In this embodiment, the shopper may place the basket on a validation unit (e.g., scale beneath an image sensor) and the system may then identify the products automatically using at least two of weight, image recognition, and historical data.

In some embodiments, the wireless communications device may be configured to detect a product being placed into the shopping basket of the customer and maintain a record of products in the shopping basket. This may occur, for example, at step 502 of process 500. In some embodiments, the wireless communications device may also maintain a record of expected weights associated with products at the retail establishment. Additionally or alternatively, the at least one processor maintain a record of expected weights associated with products at the retail store, and determining a record of the products in the shopping basket and an expected cumulative weight of the products in the shopping basket may include accessing the record directly from the processor. Thus for example, the index of selected products may initially be retained on the device used by the shopper, or the index may be maintained remote from the shopper, in system memory.

Consistent with the present disclosure, the wireless communications device may be provided by the customer, and the at least one processor may be further configured to receive via a wireless communications channel from the wireless communications device a unique identifier of the shopping basket, in order to electronically pair the customer with the shopping basket. The pairing may occur in many alternative ways. For example, at the time the customer begins a shopping session, the basket used by the customer may be recorded, either by scanning or imaging a code on the cart or by manual entry of a code into a user interface. Alternatively, a basket ID might be automatically captured, either at the initiation of the shopping session or in the checkout lane via a sensor that reads a code on the basket.

As discussed above, consistent with the present disclosure, the at least one processor may be configured to determine, based on information received from a wireless communications device of a customer, an expected cumulative weight associated with the products in the shopping basket. This may occur, for example, at step 502 of process 500. Determining the expected cumulative weight associated with the products in the shopping basket may include associating information received from the wireless communications device of the customer with a record of products. For example, as the customer places products in a basket, the customer may scan the bar code on each selected product. Or, the customer might simply record an image of the product, and a look up might subsequently occur to automatically identify the product. Alternatively, camera throughout the store might record products placed in a shopping basket. In addition to barcodes and images, as electronic tags are integrated into product packaging, tag readers might be used to identify selected products. Such tag readers may include RFID, WiFi, NFC, or any other tag readers capable of detecting an electronic tag. Thus, the terms "scanning" and "detecting" a product, are synonymously used herein to encompass any mechanism for identifying a product, whether by image, optically readable code, or electronic tag. In some embodiments, the products may be scanned and/or detected automatically by the wireless communications device of the customer as they are placed into the shopping basket. Once this information is received by the at least one processor, for example, it may determine a record of products and associate the record of products with weight information of each recorded product. The at least one processor may associate the record of products with weight information of each recorded product by accessing a data structure that stores the weight information of each product and determining a weight of each product on the record. The at least one processor may combine the determined weight of each product on the record to determine an expected cumulative weight associated with the products in the shopping basket.

Consistent with the present disclosure, the at least one processor may be configured to determine the expected cumulative weight by accessing a data set that includes pre-recorded product image data associated with a catalogue of products (index) and a weight associated with each product in the catalogue, and wherein the image data identifies each product in the catalogue from a plurality of vantage points. Because products are often loaded in baskets in a random fashion, the data set may include pre-captured images of each product from various orientations or vantage points. Thus, regardless of the loading orientation, the system may be able to recognize randomly oriented products in the basket. Accessing the data set may, for example, include comparing at least a portion of the images received from the image sensor to the image data in the data set to identify products in the basket. In making the determination that the product is in the shopping basket, the at least one processor may also take into account whether the weight associated with a product in the catalogue is consistent with the expected cumulative weight. For example, a dishwasher detergent may be offered in three sizes. The image sensor may detect the detergent label, but be unable to determine from the image the size of the product. Because each size is associated with a differing weight, the system may be able to deduce the size based on the aggregate weight of the shopping basket.

Consistent with the disclosed embodiments, determining an expected cumulative weight associated with the products in the shopping basket may include accessing a data structure, such as a database, that stores weight information on each product. The weights associated with the index of selected product may then be aggregated to arrive at a total expected weight for the products recorded as having been placed in the basket. The expected weight may be a single number or may be a range that takes into account expected deviation in individual product weights. If the expected weight is a single number, the system may be designed to permit a predetermined amount of deviation to occur without identifying such deviation as a discrepancy.

Consistent with the disclosed embodiments, the at least one processor may be configured to determine a discrepancy between the weight measurement of the products in the shopping basket and the expected cumulative weight. This may occur, for example, at step 503 of process 500. Determining the discrepancy may, for example, include comparing the weight measurement of the products in the basket with the expected cumulative weight and determining that the weight measurement is not the expected cumulative weight.

In order to determine a discrepancy, it may be necessary to take into account the weight of the basket. If quality control is tight during basket manufacture, a basket weight (i.e., aggregate of basket, frame, chassis, wheels, handle, and other components) may be substantially uniform, and may be subtracted from total measured weight in order to arrive at a measured weight of products in the basket. In situations where basket weight varies based on variations in materials, defects, or manufacturing tolerances greater than that needed for system accuracy, each cart may have a unique ID and an associated prerecorded weight. Each basket may include a unique ID, in the form of a computer or manually detectable code. A manual code may be input by a user using a user interface. A computer readable code may be automatically detected and entered into the system. Such codes may include a barcode, a QR code, an RFID, WiFi, or NFC code, or any code readable by a detector for identification of the shopping basket. Such codes may also be used to pair a wireless device of the customer with a shopping basket. A code reader for determining the ID of the basket may be located in the checkout lane or at any other location in the store. Each shopping basket may be weighed individually before use and/or periodically, and the weights stored in a data structure associated with the system and accessible by the at least one processor or any other component of the system. Then, at checkout, the weight of the basket may be subtracted by the system from the total weight measurement to arrive at an aggregate weight of products in the basket.

In some situations, however, determining that the weight measurement is not the expected cumulative weight may not be sufficient to determine that an actual discrepancy exists for the purposes of some embodiments of the present disclosure. For example, depending on the retail establishment and the products sold therein, there may naturally be some variance between products of the same type due to production, manufacturing, and/or packaging defects or the like. Therefore, it may be expected that the weight measurement will not be the expected cumulative weight, and it may be necessary to determine whether the weight measurement is inconsistent with the expected cumulative weight.

Thus, determining that the weight measurement is inconsistent with the expected cumulative weight may involve determining that the difference between the weight measurement and the expected cumulative weight exceeds a statistical threshold, thereby indicating a discrepancy. The statistical threshold may, for example, be based on weight data associated with the products in the shopping basket and/or the shopping basket itself stored on a data structure of the system, and may be further based on a desired predictability or confidence level. The confidence level may be set and/or adjusted based on, for example, specific goals of the retail establishment. Additionally or alternatively, the confidence level may be set and/or adjusted based on a determined trust level associated with the customer making the transaction. A trust level may be determined, for example, by the number, frequency, and/or size of transactions between the customer and the retail establishment, and weight discrepancies associated with prior shopping sessions. The weight data may include, for example, average weights of each product and the standard deviations in weight for each product. Based on the average weights of each product, the standard deviations in weight for each product, and the desired confidence level, the at least one processor, for example, may determine that there is a discrepancy between the weight measurement of the products in the shopping basket and the expected cumulative weight (i.e., whether it is statistically probable that the actual contents of the basket are not the recorded contents).

Consistent with the disclosed embodiments, the at least one processor may be configured to reconcile the determined discrepancy using the at least one captured image of the shopping basket by the at least one image sensor. This may occur, for example, at step 504 of process 500. As discussed above, the at least one image sensor may include, for example, at least one of a camera, spectrometer, infrared sensor, RFID sensor, and/or any other suitable sensor that is configured and operative for gaining information about the product items placed in a shopping basket and/or the shopping basket itself. The at least one image sensor may capture at least one image of the shopping basket and its contents and relay the at least one image to the at least one processor. The at least one processor may be configured to perform object detection and recognition functions on at least one image of shopping basket to determine the contents of the shopping basket. Based on the determined contents based on the at least one captured image, the processor may identify and reconcile the discrepancy by determining that the images indicate that at least one product in the shopping basket is not present on the record. For example, if a measured weight discrepancy is 349 grams, and if the image sensor detects a can of tomato soup in the basket which is not on the index of products in the cart, the system may look up the weight of the tomato soup can as 350 grams, add the can to the index of purchased products, and thereby reconcile the discrepancy within an acceptable weight deviation threshold of the system. (in this instance, the 1 gram delta is within an acceptable deviation range set by the system. The system may be configured to create a new reconciled record including the non-scanned item (the soup can) or may simply update the prior record.

A single adjustment may be insufficient to reconcile the basket weight if more than one product was not properly scanned before placement in the cart. In such instances, the process may iteratively review the image data identifying additional missing products until the discrepancy is reconciled. Alternatively, the system may perform a single reconciliation of multiple missing products simultaneously.

Consistent with disclosed embodiments, reconciling the determined discrepancy may include automatically updating the record with at least one additional product not included in the record and identified through analysis of the at least one captured image. In some situations, for example, the system may be able to determine that there is there is a substantial enough certainty that a particular product that is missing from the record is in the shopping basket. For example, the shopping basket may only contain a few objects, and the at least one processor may be configured to determine that every object in the shopping basket was captured by the image sensor and identified. Additionally or alternatively, the at least one processor may be configured to perform a statistical analysis, similar to the statistical analysis discussed above, to determine that the likelihood that the system has correctly identified the missing product exceeded a determined confidence level, and in response to the determination, update the record.

The system may be configured to query the shopper, either on the shopper's wireless communications device or on a POS interface about whether a particular product is in the basket. This may occur each time the system identifies a likely missing product or may occur only if a confidence level associated with the likely missing product is below a threshold.

In some situations, the system may not be able to determine with enough certainty that a product is in a shopping basket but is not included in the record. For example, in large orders, the customer may stack one or more products on top of or next to each other, which may occlude or otherwise obfuscate them from the view of the at least one image sensor, and/or certain components of the shopping basket may occlude or otherwise obfuscate them from the view of the at least one image sensor. Therefore, it may be desired to implement alternative embodiments to confirm the identity of the product that is not included in the record in order to reconcile the discrepancy. These alternative embodiments may include prompting the customer to rearrange products in the basket after which the imaging system has an opportunity to capture new images of basket contents. In addition, or alternatively, multiple cameras may be used to capture the basket from multiple angles and vantage points.

As discussed above, the at least one image sensor may include a top view camera mounted in a position enabling capture of a top view image of the shopping basket. In some embodiments, however, the at least one image sensor may include at least one additional camera positioned to capture at least one of a side view image or bottom view image of the shopping basket, and wherein reconciling includes using at least the top view image and at least one of the side view image and the bottom view image to identify at least one product missing from the record. When a shopping basket is filled with products, there may be products in the bottom of the basket that cannot be captured by a top view camera due to obfuscation by other products. In this situation, an at least one additional camera positioned to capture side view images may be advantageous. However, there may be products in the middle of the basket where and image of the products cannot be captured by a side view camera due to obfuscation by other products on the outside of the basket. In this situation, an at least one additional camera positioned to capture bottom view images from a bottom view may be advantageous. FIGS. 4A, 4B, 4C, 4D and 4E illustrate five exemplary embodiments, each having cameras varying in number and positioning. It will be appreciated that any number of cameras and any positioning of the cameras may be used to capture different views of a shopping basket, and disclosed embodiments are not limited to those configurations illustrated in FIG. 4.

Consistent with disclosed embodiments, reconciling the determined discrepancy may include recommending to the customer, based on the at least one captured image, a product for inclusion in the record. Recommending to the customer a product for inclusion may include prompting the customer, through an interface component of the system, to confirm whether a particular product is in the shopping basket. Consistent with this disclosure, an interface component may be configured to interact with the customer. The interface component may include any type of visual, audible, or tactile device for communicating with the customer either on the customer's mobile communications device or on a POS interface. The interface component may, for example, include an interface screen that displays the recommendation to the customer and prompts the customer to confirm the identity of a product in the basket. For example, the interface may prompt the user to click displayed products that are in the basket but that may not have been properly scanned. The prompt may be based on one or more of information gleaned from the image sensors in the checkout lane, historical data of purchases by the particular shopper (e.g., this shopper buys milk 95% of the time, but milk was not scanned into the basket), or historical data of products typically purchased together (e.g., statistically, those who buy tacos, also buy taco sauce.) Historical data may include customer buying habits, shopping habits, or buying history (of the particular customer, similar customers, or all customers). The prompts may also be based on known product weights. For example, if the discrepancy in basket weight is 8.6 lbs, and the system knows both that this customer typically buys a gallon of milk and that the milk weighs between 8.5 and 8.8 lbs, the user may be prompted to confirm whether a gallon of milk is in the cart. There may be multiple brands of milk, and the prompt may include product images and a request to select the appropriate image. But if the discrepancy is only 2 lbs, the system may not identify milk as the possible cause of the discrepancy. Based on the customer's response, the at least one processor may update the record of products to complete the reconciliation process.

Consistent with the present disclosure, the at least one processor of the system may further be configured to determine a customer identifier associated with the customer, and to access customer account data using the customer identifier. Determining a customer identifier associated with the customer may be based on the credit card or payment method of the customer. For example, when purchasing products from a retail establishment, the customer may use a credit card, a wireless payment application on their wireless communication device, or any other suitable payment method that may provide enough information to the system for the at least one processor to be able to associate the information with a customer identifier or a customer account. In some embodiments, a customer identifier may be determined before the customer conducts a transaction at the retail establishment. For example, the customer may possess a wireless communications device that is configured to automatically transmit the customer identifier to the system, or it may be configured to transmit upon activation of an application installed onto the wireless communications device. For example, the wireless communications device of the customer may be the same device that the customer uses to generate a record of products in the shopping basket. In some embodiments, determining a customer identifier associated with the customer may be based on biometrics. For example, the system may be equipped with devices or systems configured to identify a customer based on facial recognition, fingerprint scanning, or other biometric data.

Consistent with the present disclosure, accessing customer account data may include associating the customer identifier with an account, and accessing the associated account. The account may be associated with, for example, the retail establishment or more generally with the system. The customer account may be created and accessed by the customer online. The customer account may include customer account data, which may include the historical purchase records of the customer (i.e., a record of previous purchases made by the customer). For example, a data structure maintained by the retail establishment, or a service provider associated with the retail establishment, may keep a record of items purchased by a particular customer. The historical purchase records may be generated, for example, through an account of the customer associated with the retail establishment that records when the customer purchases particular products from the retailer.

Consistent with the present disclosure, and as mentioned earlier, reconciling the determined discrepancy may be based on historical purchase records of the customer. For example, through access of historical data recorded in the customer account, the system may be able to determine at least one item previously purchased at least once by the customer that corresponds to the weight discrepancy. If so, those items might be given higher priority when attempting to reconcile a cart weight discrepancy. For example, by performing an analysis on the historical purchase records of the customer, the at least one processor may determine that if a customer purchases at least one of a first product, then the customer is likely to purchase at least one of a second product. However, the first product may be in the shopping basket and also be on the record, whereas the second product is not on the record but has a weight that corresponds substantially to the determined discrepancy. In some embodiments, the processor may be configured to perform a similar analysis on a plurality of products as opposed to just two (i.e., the at least one processor may determine that certain groups of products have a high likelihood of being purchased together). Based on the likelihood of the customer to purchase certain combinations of items at the same time, and the correspondence of the weight of at least one products that is not on the record with the determined discrepancy, the at least one processor may determine that there is a high probability the at least one product that is not on the record is in the shopping basket, and reconcile the discrepancy based on that determination. In some embodiments, the processor may also be configured to determine that the customer is unlikely to purchase combinations of certain items, and use those inferences in reconciling discrepancies.

Figure 6:
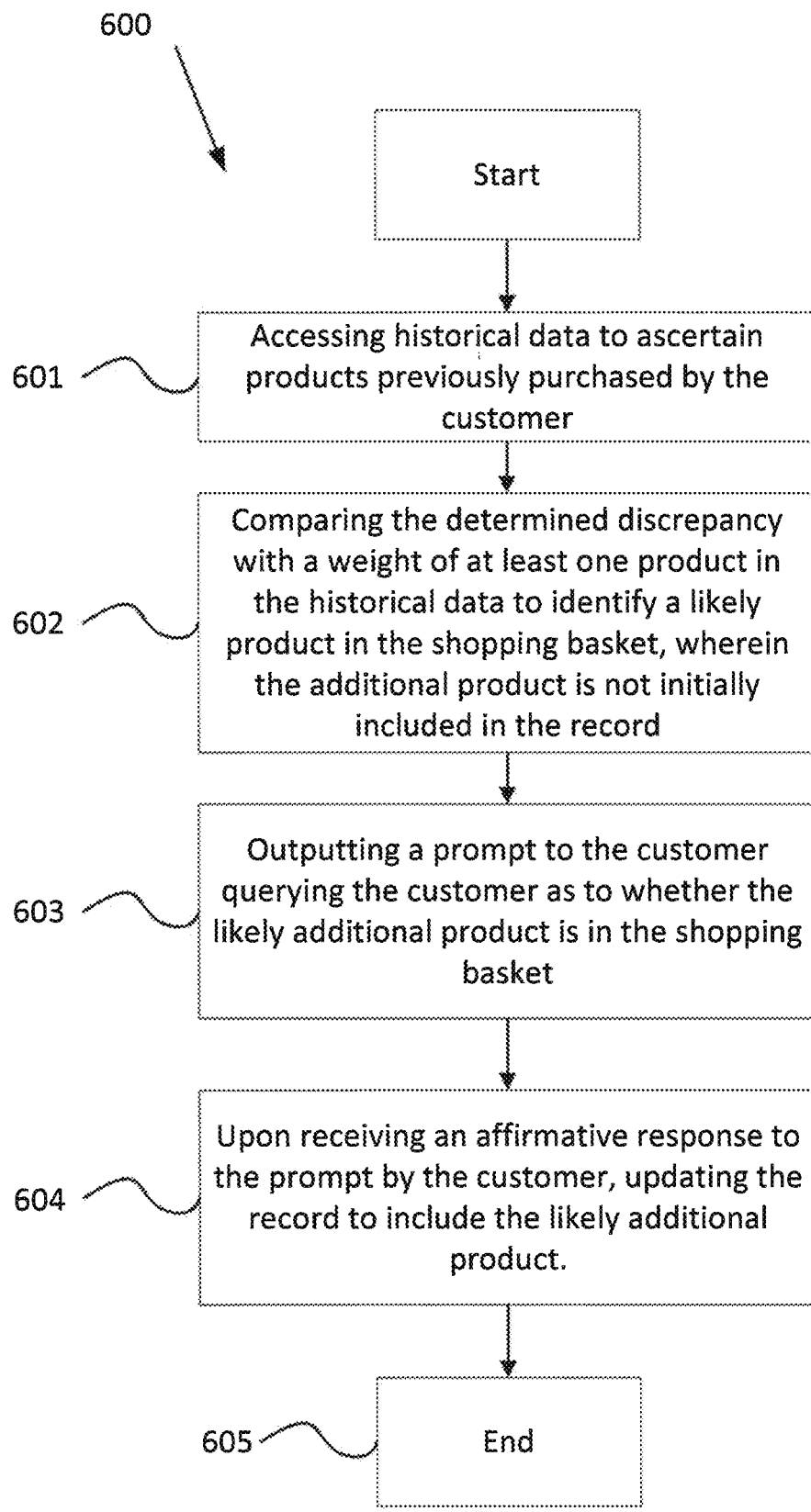
FIG. 6 is a flow chart illustrating an exemplary process of how an embodiment of the disclosed systems may determine and reconcile a discrepancy based on historical data of items previously purchased by the customer.

FIG. 6 provides a flow chart of an exemplary process 600 that illustrates how historical records may be used in reconciliation. Exemplary process 600 may be a process that is executed by the at least one processor to reconcile a discrepancy between the weight measurement of the products scanned into the shopping basket and the expected cumulative weight. Reconciling the determined discrepancy may include accessing historical data to ascertain products previously purchased by the customer, which may occur at step 601 of process 600. As described above, the system may determine a customer identifier with an account, and based on the identifier, accessing the associated account in order to access the historical data.

Consistent with the present disclosure, reconciling the determined discrepancy may include comparing the determined discrepancy with a weight of at least one product in the historical data to identify a likely additional product in the shopping basket, wherein the additional product is not initially included in the record. In exemplary process 600, this may occur at step 602. For example, the historical data may include a record that a particular product has been purchased at least once by the customer. If the particular product has a weight that significantly corresponds to the determined discrepancy, the at least one processor may determine that the particular product is a likely additional product in the shopping basket, and reconcile the discrepancy based on the determination.

Consistent with the present disclosure, reconciling the determined discrepancy may include outputting a prompt to the customer querying the customer as to whether the likely additional product is in the shopping basket. In exemplary process 600, this may occur at step 603. As discussed above, outputting a prompt to the customer may include prompting the customer, through an interface component of the system, whether the customer placed the likely product in the shopping basket. Querying the customer may include displaying, for example, a prompt on a touch screen associated with the system, such as "Is item X in your shopping basket?" and may have options such as "YES" or "NO" that the customer may touch to confirm whether they placed the item in their shopping cart. Alternatively, or additionally, images of a group of products having weights consistent with the discrepancy may be displayed to the customer, and the customer asked to click on or otherwise identify those products that are in the customer's basket. Upon receiving an affirmative response to the prompt by the customer (e.g., the customer selected "YES"), the at least one processor may update the record to include the likely additional product. In exemplary process 600, updating the record may occur at step 603.

According to other embodiments, a customer need not necessarily scan items placed in the shopping basket. Rather, in the checkout lane, the weight of the shopping basket may be reconciled with images of the shopping basket captured in the checkout lane to ascertain the contents of the basket. Discrepancies so determined can be reconciled using mechanisms along the lines of those described above. Alternatively, if no basket is used, non-scanned items may be weighed and reconciled in the checkout lane using images captured in the checkout lane.

Consistent with the present disclosure, the at least one processor may be configured to associate with the customer a charge for products determined to be in the shopping basket, where the at least one processor is configured to determine the associated charge based on the use of a set of product images (or other data) captured by the wireless communications device of the customer, and the at least one image sensor in the vicinity of the scale. For example, products may be determined to be in the shopping basket by using at least two different image sensors, detectors, and/or cameras at two different locations in the purchasing process. The wireless communications device of the customer may be configured with an image sensor that captures a first image or set of images of a product placed in the customer's shopping basket, such as when the customer selects a product in an aisle. Based on the first set of images, the at least one processor may establish a first record of products in the basket. When the customer checks out, an image sensor associated with the self-checkout may capture a second set of images and establish a second record of products based on the second set. The two records may then be compared to verify a transaction based on the consistency of the two records. If the two records are inconsistent, the at least one processor may determine that an inconsistency exists.

Consistent with the present disclosure, a non-transitory computer readable medium containing instructions for use in self-checkout at a retail establishment is disclosed. The instructions may, when executed by a processor, cause the processor to perform a method. The method may include, for example, performing any one or more of the functions described in the present disclosure in relation to the at least one processor of the disclosed systems. For example, the method may include receiving, from a scale, a weight measurement of a shopping basket; determining, based on information received from a wireless communications device of a customer, a record of products in the shopping basket and an expected cumulative weight associated with the products in the shopping basket; determining a discrepancy between the weight measurement of the shopping basket and the expected cumulative weight; receiving, from an image sensor in a vicinity of the scale at least one image of the shopping basket; performing an image analysis on the at least one image to determine products in the shopping basket; and reconciling the determined discrepancy using the determined products in the at least one captured image of the shopping basket by identifying in the at least one captured image at least one product missing from the record; and updating the record with the at least one missing product.

Consistent with the present disclosure, the method may further include recalculating the expected weight of the products in the shopping basket based on the updated record. For example, once the record has been updated, recalculating the expected weight may include accessing a data structure to access the average weight and standard deviation of the at least one products that have been added to the record due to reconciliation, and taking into account the average weight and standard deviations of the at least one product that was originally in the record and of the at least one product added to the record to determine a new expected weight of the products in the shopping basket. In some embodiments, the new expected weight of the products in the shopping basket may be used to validate that the updated record is accurate or determine that a discrepancy still exists and reconciling the discrepancy.

Consistent with the present disclosure, the method may also include, prior to updating the record, presenting to the customer a request to confirm that the customer placed the at least one missing product in the shopping basket. Presenting to the customer a request that the customer placed the at least one missing product in the basket may include prompting the customer, through an interface component associated with the self-checkout, to confirm whether a certain product is in the shopping basket. The interface component may, for example, be a touch screen that displays the recommendation to the customer and prompts the customer to respond "YES" or "NO" to whether an item is in the basket. The recommendation may be based on an item that the at least one processor determined was not in the shopping basket based on the at least one captured image. Based on the customer's response, the record of products may be updated to complete the reconciliation process, consistent with the disclosed method.

In some embodiments, the at least one image sensor used in the method may include a top view camera mounted above the scale, configured to capture a top view image of the shopping basket. A few possible configurations of exemplary image sensors 103 are illustrated in FIGS. 4A, 4B, 4C, 4D, and 4E. In some embodiments, the at least one image sensor may further include at least one of a side view camera configured to capture a side view image of the shopping basket and a bottom view camera configured to capture a bottom view image of the shopping cart, and reconciling may include using at least the top view image and at least one of the side view image and the bottom view image to identify at least one product missing from the record.

Clickless Population of Electronic Shopping Cart

Disclosed embodiments may enable clickless population of a shopping basket list (clickless feature). For example, a scanner or image sensor may detect a product or product code in a field of view and may automatically record a product as being placed in a cart without a user having to affirmatively click a capture button. No click is necessary because the system may distinguish between products that simply enter the field of view of the camera, and products that are actually selected for purchase. It may do this by determining proximity to a sensor (e.g. movement of the product relative to the sensor—a product being purchased is typically held close to a sensor while a product on a shelf in the field of view is much further from the sensor.)

Consistent with the present disclosure, this clickless feature may include a computer readable medium containing instructions for controlling a handheld image sensor to populate an electronic shopping basket with products selected in a retail establishment by a customer, the instructions comprising: activating the image sensor to capture a continuous stream of images including images of products in the retail establishment; detecting in the continuous stream of images a first product; detecting in the continuous stream of images a second product; detecting in the continuous stream of images a third product; determining based at least in part on relative movement between the image sensor and the first product, an intent of the customer to purchase the first product; determining based at least in part on relative movement between the image sensor and the second product, an intent of the customer not to purchase the second product; determining based at least in part on relative movement between the image sensor and the third product, an intent of the customer to purchase the third product; associating the first product and the second product with an electronic shopping basket of products selected for purchase; and omitting from the electronic shopping basket the second product.

Consistent with the present disclosure, in some embodiments of the clickless feature the handheld image sensor may be part of a wireless communications device of the customer.

Consistent with the present disclosure, some embodiments may contain the clickless feature, wherein the wireless communications device is at least one of a cell phone, a tablet, a handheld scanner, and a network-enabled camera.

Consistent with the present disclosure, in some embodiments of the clickless feature the stream of images encompasses images captured over substantially an entire shopping event from first product selection until a time of checkout.

Consistent with the present disclosure, in some embodiments of the clickless feature the relative movement between the image sensor and the first product indicating the intent includes the first product being maintained in a field of view of the image sensor beyond a time threshold.

Consistent with the present disclosure, in some embodiments of the clickless feature the relative movement between the image sensor and the first product indicating the intent includes the first product being maintained in a field of view of the image sensor beyond a time threshold and within a distance threshold to the image sensor.

Consistent with the present disclosure, in some embodiments of the clickless feature the indication of intent further includes detection by the image sensor of the first product being held by the customer.

Consistent with the present disclosure, in some embodiments of the clickless feature the indication of intent further includes detection by the image sensor of the first product being placed in the shopping basket by the customer.

Consistent with the present disclosure, in some embodiments of the clickless feature the intent by the customer not to purchase the second product is determined, at least in part, by the second product being maintained in a field of view of the image sensor for a time period shorter than a time threshold.

Consistent with the present disclosure, in some embodiments of the clickless feature the intent by the customer not to purchase the second product is determined, at least in part, by the second product being beyond a threshold distance from the image sensor.

Avoiding Duplicate Capture of the Same Product

Consistent with disclosed embodiments, in order to prevent multiple and unintended scans of selected products, a scanning system that executes an auto-delay, or lag, between a first capture and a second capture is disclosed (lag feature).

Consistent with the present disclosure, embodiments of the lag feature may include a computer readable medium containing instructions for controlling an image sensor to populate an electronic shopping basket with products selected in a retail establishment, the instructions comprising: activating the image sensor to capture at least one stream of images during a shopping session; detecting in the at least one stream of images, at least one image of a first product selected by a shopper for purchase; saving in the electronic shopping basket the at least one image of the first product or an identity of the first product determined by image recognition; capture a second image; determine based on image data, whether the second image is part of the first product; determining a consistency between the at least one image of the first product and the second image; and after determining the consistency, saving in the electronic shopping basket product information associated with the first product.

Consistent with the present disclosure, in some embodiments of the lag feature, the image sensor is contained within a wireless communications device.

Consistent with the present disclosure, in some embodiments of the lag feature, the wireless communications device is at least one of a cell phone, a tablet, a handheld scanner, and a network-enabled camera.

Consistent with the present disclosure, in some embodiments of the lag feature, the second mage is captured only after a predetermined period of time has elapsed.

Consistent with the present disclosure, in some embodiments of the lag feature, the instructions further include preventing the second image from being saved prior to the determination that the predetermined period of time has elapsed.

Consistent with the present disclosure, in some embodiments of the lag feature, the predetermined period of time corresponds to a period of time associated with placing the product in a physical shopping cart.

Consistent with the present disclosure, in some embodiments of the lag feature, the instructions further include detecting a triggering motion.

Consistent with the present disclosure, in some embodiments of the lag feature, the second image is captured in response to detection of the triggering motion.

Consistent with the present disclosure, in some embodiments of the lag feature, the instructions further include preventing the second image from being saved in an absence of the triggering motion.

Consistent with the present disclosure, in some embodiments of the lag feature, the image recognition includes determining product identity based on a detected bar code.

Consistent with the present disclosure, in some embodiments of the lag feature, the image recognition includes determining a product identity based on a comparison of at least one of size, shape, and product aesthetics in the captured product image with identification data pre stored in a data structure.

Consistent with the present disclosure, in some embodiments of the lag feature, the shopping session encompasses a period of selection of a plurality of products and wherein the instructions include maintaining the image capture session in a continuous mode to enable detection of products without control manipulation by a user.

Inclined Ramps Bracket Cart in Camera Position

Consistent with the present disclosure, a cart weighing station may include an elevated scale integrated into a platform with opposing ramps. The weighing station between the ramps aligns with a camera arranged above a cart level, such that with the cart in the weighing station between the ramps, the camera may capture the cart contents (aligned ramps feature).

Consistent with the present disclosure, the aligned ramps feature may include a checkout system for transaction validation at a retail establishment, the system comprising: a scale sized to support a shopping cart, the scale being integrated into a platform having an upper surface configured to be elevated from a floor of the retail establishment; a pair of ramps, each of the pair of ramps being configured to extend between the floor and the upper surface of the platform on opposing sides of the scale, with a weighing region therebetween, such that when the wheels of the shopping cart are located between the pairs of ramps on the weighing region, the scale is capable of weighing the shopping cart; at least one image sensor, positioned relative to the weighing region such that when the shopping cart is positioned between the pair of ramps on the weighing region, the at least one image sensor is configured to capture images from a position above a height of the shopping cart; and at least one processor configured to: receive data output from the scale; receive data output from the at least one image sensor; and verify the contents of the shopping cart using the scale data output and the image sensor data output.

Consistent with the present disclosure, in some embodiments of the aligned ramps feature, the scale has a sensitivity of about 10 grams.

Consistent with the present disclosure, in some embodiments of the aligned ramps feature, each of the pair of ramps may have a pitch of no more than six degrees.

Consistent with the present disclosure, in some embodiments of the aligned ramps feature, the at least one image sensor includes a camera.

Consistent with the present disclosure, some embodiments of the aligned ramps feature may include at least one support for suspending the image sensor above the weighing region.

Consistent with the present disclosure, some embodiments of the aligned ramps feature may include a detector for detecting an identity of a customer associated with the shopping cart.

Consistent with the present disclosure, in some embodiments of the aligned ramps feature, the identity of the customer is detected based on facial recognition Consistent with the present disclosure, in some embodiments of the aligned ramps feature, the identity of the customer is detected based on a pairing of the cart with a personal mobile communications device of the customer.

Purchase Verification by Two Different Cameras at Different Times

Consistent with the present disclosure, at least two different cameras may be used at two different locations to verify purchases. (dual camera verification feature). A first camera (or other detector) records a user's selection of a product in an aisle where the products are located, and a second camera is used to confirm the product selection in the checkout lane.

Consistent with the present disclosure, the dual camera verification feature may include a computer readable medium containing instructions for streamlining purchasing of products in a retail establishment, the instructions comprising: storing first image-related data received from a handheld first image sensor used by a customer to capture a plurality of images of products placed in a shopping basket over a course of a shopping trip; establishing from the first image-related data an index of products likely placed in the shopping basket; controlling at least one second image sensor associated with a checkout aisle of the retail establishment to gather second image-related data associated with products in the shopping cart; comparing the first image-related data with the second image-related data to determine a consistency between the index of products likely placed in the shopping cart and the products determined to be in the cart as determined from the second image data; and verifying a shopping transaction based on the determined consistency.

Consistent with the present disclosure, in some embodiments of the dual camera verification feature, the handheld first image sensor is associated with a mobile communications device of the customer.

Consistent with the present disclosure, in some embodiments of the dual camera verification feature, the at least one second image sensor is fixedly mounted at a checkout lane in a retail establishment.

Consistent with the present disclosure, in some embodiments of the dual camera verification feature, the at least one second image sensor includes a plurality of image sensors oriented to capture the contents of the shopping basket from various vantage points.

Consistent with the present disclosure, in some embodiments of the dual camera verification feature, the shopping basket is a shopping cart.

Consistent with the present disclosure, in some embodiments of the dual camera verification feature, verifying the shopping transaction includes determining that no products beyond the index of products are identified in the second image data.

Consistent with the present disclosure, some embodiments of the dual camera verification feature include calculating a total expected weight associated with the index of products, and receiving a measured weight of the products in the basket, and wherein verifying the shopping transaction includes comparing the total expected weight with the measured weight.

Overhead Camera in an Automated Checkout Line

Consistent with the present disclosure, embodiments may include an overhead camera in the checkout lane (overhead camera feature). Such embodiments may include a self-checkout system for transaction validation at a retail establishment, the system comprising: a checkout station in a retail establishment, the checkout station being sized to receive a shopping cart therein, wherein a top edge of the shopping cart defines an upper cart position when a shopping cart is in the checkout station; an image sensor; a support configured to suspend the image sensor at a height above the upper cart position to thereby enable the image sensor to capture images of the cart from above; an interface for conveying image data from the image sensor to at least one processor, the at least one processor being configured to: identify products in the image data, compare the identified products with stored data identifying the cart contents, verify a transaction based on the comparison; and output a verification signal indicating that the transaction is verified.

Consistent with the present disclosure, some of the overhead camera feature may include at least one additional image sensor located below the upper cart position, and wherein the interface is configured to convey additional image data from the additional image sensor to the at least one processor to verify the transaction.

Consistent with the present disclosure, some embodiments of the overhead camera feature may include at least one additional image sensor located above the upper cart position, and wherein the interface is configured to convey additional image data from the at least one additional image sensor to the at least one processor to verify the transaction.

Consistent with the present disclosure, in some embodiments of the overhead camera feature, the verification signal is configured to cause a verification indication to be presented to the customer on a display.

Consistent with the present disclosure, some embodiments of the overhead camera feature may include a detector associated with the checkout line for identifying a customer associated with the transaction.

Consistent with the present disclosure, in some embodiments of the overhead camera feature, the detector includes a code reader for identifying the shopping cart, and wherein the at least one processor identifies the customer based on a previously associated identity of the customer with the shopping cart.

Consistent with the present disclosure, in some embodiments of the overhead camera feature, multiple cameras in a checkout lane may be provided to capture images of shopping cart contents from various angles, and configured to use the combined image data to reconstruct images of products in the shopping cart.

Cart Contents Verified from Differing Vantage Points

Consistent with the present disclosure, multiple cameras may be used in the checkout lane to capture the cart from multiple vantage points (multiple vantage point feature). Embodiments including this feature may involve a computer readable medium containing instructions for streamlining purchasing of products in a retail establishment, the instructions comprising: controlling a first image sensor positioned adjacent a checkout lane in a retail establishment; obtaining first image data of shopping cart contents from a first vantage point, wherein the shopping cart contents include a plurality of products, and wherein at least a first product obfuscates (e.g., occludes, blocks, or otherwise wholly or partially masks) at least a second product in a field of view of the first image sensor, thereby preventing the first image sensor from collecting sufficient data to identify the second product; controlling a second image sensor positioned adjacent to the checkout lane; obtaining second image data of the shopping cart from a second vantage point, wherein at least a third product obfuscates a fourth product in a field of view of the second image sensor, thereby preventing the second image sensor from collecting sufficient data to identify the fourth product; aggregating the first image data and the second image data to generate composite data for the second product and the fourth product; comparing the composite data for the second product with prestored product identity information to thereby identify the second product; comparing the composite data for the fourth product with the prestored product identity information to thereby identify the fourth product; and validating a purchase transaction that includes the second product and the fourth product.

Consistent with the present disclosure, some embodiments of the multiple vantage point feature may include comparing identities of the identified second product and the identified fourth product with a previously generated index of products selected for purchase by the customer to determine a match.

Consistent with the present disclosure, in some embodiments of the multiple vantage point feature, the field of view of the first image sensor overlaps with the field of view of the second image sensor.

Consistent with the present disclosure, in some embodiments of the multiple vantage point feature, the first vantage point is above the shopping cart and the second vantage point is at a side of the shopping cart.

Consistent with the present disclosure, in some embodiments of the multiple vantage point feature, aggregating the first image data and the second image data includes stitching together the first image data and the second image data.

Consistent with the present disclosure, in some embodiments of the multiple vantage point feature, the prestored product identity information is a storewide index of products available for sale in the retail establishment.

Pairing Personal Mobile Phone with a Shopping Cart

Consistent with the present disclosure, systems wherein a registered customer may enter a retail establishment, select a shopping cart, pair a personal mobile phone with the shopping cart and then begin shopping are disclosed. This can occur, for example, through an interface that enables a shopper to scan a QR code or other code associated with the shopping basket. The code can, for example, appear on the handle of the basket, or on some other location viewable to the shopper. Every product scanned with the mobile phone and placed in the cart will then be automatically associated with the customer's account and the particular cart (pairing feature). When the cart is recognized and is on a scale in the checkout lane, the customer's identity will already be associated with the cart, and an expected weight of the products in the cart will already be calculated and subtracted from a total measured weight of the cart.

Consistent with the present disclosure, the pairing feature may involve a computer readable medium containing instructions for performing steps for streamlining purchasing of products in a retail establishment, the steps comprising: receiving via a wireless communications channel from a mobile communications device of a shopper an identification of a particular shopping cart being used by the shopper, in order to electronically pair the shopper with the particular shopping cart; retrieving from a storage location a weight of the particular shopping cart; retrieving data associated with an account of the shopper; associating the weight of the particular shopping cart with a current shopping event of the shopper; receiving from the mobile communications device of the shopper, image-related data reflecting selected products placed in the particular shopping cart by the shopper; receiving an indication that the particular shopping cart has arrived at a checkout location in the retail establishment; receiving from a scale at the checkout location a total weight of the particular shopping cart and the selected products; subtracting the weight of the particular shopping cart from the total weight to determine an aggregate weight of the selected products; comparing the aggregate weight of the selected products with an expected total weight of the selected products to determine a substantial match; and verifying a purchase transaction based on the determined substantial match.

Consistent with the present disclosure, in some embodiments of the pairing feature, the mobile communications device is at least one of a mobile phone, a tablet, and a wearable device.

Consistent with the present disclosure, in some embodiments of the pairing feature, retrieving a weight of the particular shopping cart includes accessing a data structure containing pre-stored weights.

Consistent with the present disclosure, in some embodiments of the pairing feature, receiving an indication that the particular shopping cart has arrived at a checkout location includes obtaining from a processor at the checkout location a signal representing a code associated with the particular shopping cart.

Consistent with the present disclosure, in some embodiments of the pairing feature, the code is at least one of a bar code, a QR code or any other identifying marking or signal scanned from the cart. This step may also be skipped when the shopper uses a basketless transaction (carries the products without a basket.)

Consistent with the present disclosure, in some embodiments of the pairing feature, the code is a digital signature obtained from at least one of an RFID code, NFC code, or other passive tag on the shopping cart.

Scales Integrated into Shopping Cart Wheels

Consistent with the present disclosure, strain gauges may be incorporated into the wheels of shopping carts and the weight of the cart may be ascertained from signals received from the wheels are disclosed (scales in wheels feature).

Consistent with the present disclosure, this feature may involve a self-weighing shopping cart, comprising: a basket; a frame supporting the basket; a plurality of wheels extending from the frame; a shopping cart identifier for enabling a determination of an empty weight associated with the shopping cart; a plurality of sensors, each sensor being associated with each of the plurality of wheels; and at least one transmitter associated with the plurality of sensors, the at least one transmitter being configured to: communicate with a receiver in a checkout lane of a retail establishment, and enable a determination of an aggregate weight of products in the shopping cart, through an aggregation of data received from the plurality of sensors for determining a total cart weight, and through a subtraction of the empty cart weight, determined through the use of the shopping cart identifier, from the total cart weight.

Consistent with the present disclosure, in some embodiments of the scales in wheels feature, the shopping cart identifier includes a serial number.

Consistent with the present disclosure, in some embodiments of the scales in wheels feature, the shopping cart identifier includes a computer readable code.

Consistent with the present disclosure, in some embodiments of the scales in wheels feature, the computer readable code is at least one of a bar code, a QR code, or another computer readable code.

Consistent with the present disclosure, some embodiments of the scales in wheels feature may include at least one energy storage element for powering the at least one transmitter.

Consistent with the present disclosure, some embodiments of the scales in wheels feature may include an electrical generator coupled to at least one wheel, for recharging the energy storage element.

Consistent with the present disclosure, in some embodiments of the scales in wheels feature, each strain gauge is configured to measure a force exerted on each wheel.

Consistent with the present disclosure, some embodiments of the scales in wheels feature, may include aggregating strain gauge data from each strain gauge to determine a total cart weight.

Consistent with the present disclosure, in some embodiments of the scales in wheels feature, total cart weight includes a basket weight, a frame weight, and the weight of products in the shopping cart.

Establish a Weight Based Data Set of Product Images

For a retail system to effectively operate, every product available for sale in a retail establishment must be weighed and its weight recorded along with image data associated with the product and a product designation. Consistent with the present disclosure, systems for establishing the dataset needed to initiate a retail system are disclosed (dataset initiation feature).

Consistent with the present disclosure, the dataset initiation feature may involve a system for generating a data set correlating product weight to product identity, the system comprising: at least one image sensor configured to capture images of a product from a plurality of vantage points; a weight scale; at least one processor configured to: receive from at least one image sensor images of the product to thereby generate identifying image data associated with the product; receive from the scale a weight of the product; receive an alphanumeric identifier for the product; and associate in the data structure the identifying image data, the product weight, and the product identifier; and enable during a subsequent shopping process by a customer, a look up of product weight of the product when an image of the product is captured.

Consistent with the present disclosure, some embodiments may contain the features of Example 9, wherein the at least one image sensor includes a plurality of image sensors arranged about an image capture zone.

Consistent with the present disclosure, in some embodiments of the dataset initiation feature, the at least one image sensor is configured to move relative to the image capture zone.

Consistent with the present disclosure, in some embodiments of the dataset initiation feature, the at least one processor is configured to merge the plurality of images into a single image data set.

Consistent with the present disclosure, some embodiments of the dataset initiation feature, may include storing the associated data structure in a database.

Consistent with the present disclosure, in some embodiments of the dataset initiation feature, the alphanumerical identifier of the product includes at least one of an SKU or a serial number unique to the product.

Adaptive Thresholds for Trusted Customers

A retail system consistent with disclosed embodiments may treat customers differently based on a trust level. For example, if a particular customer's cart is routinely validated without incident, the system may treat current deviations for the same customer more leniently (trusted customer feature).

Consistent with the present disclosure, the trusted customer feature may involve a computer readable medium containing instructions for treating customers differently during automated checkout based on trust levels, the instructions comprising: receiving from an automated checkout station in a retail establishment an indication of a customer involved in a check out process; receiving from the automated checkout station aggregate data characterizing a group of products selected for purchase; comparing the aggregate data with product-specific data obtained during product selection by the customer, to determine a current deviation between the aggregate data and the product-specific data; accessing an account associated with the customer to determine a historical deviation indication associated with the customer; selecting a deviation threshold for the customer based on the historical deviation indication; comparing the current deviation with the selected deviation threshold to determine whether the current deviation falls within the deviation threshold selected for the customer; and authorizing a purchase transaction for the products selected for purchase if the current deviation falls within the deviation threshold selected for the customer.

Consistent with the present disclosure, in some embodiments of the trusted customer feature, the aggregate data characterizing a group of products selected for purchase includes a total weight of the group of products.

Consistent with the present disclosure, in some embodiments of the trusted customer feature, the aggregated data characterizing the products selected for purchase includes an image of a shopping cart in which the products being purchased are located.

Consistent with the present disclosure, some of the trusted customer feature may include updating for a future transaction, the deviation threshold for the customer based on the current deviation.

Consistent with the present disclosure, some embodiments of the trusted customer feature may include determining a likelihood that a frequently purchased product associated with the customer matches the current deviation.

Automatic Weight Corrections when Products Change

Over time, the weight of a product may change, due, for example, to changes in the weight of ingredients or the adoption of differing packaging materials. Because a retail system may analyze volumes of data across many shopping baskets, it may recognize that baskets containing a particular product tend to vary from weight expectations. When this occurs, disclosed systems may automatically update the expected weight of the product (automatic weight update feature).

Consistent with the present disclosure, the automatic weight update feature may include a computer readable medium containing instructions for accounting for variances in product weights in an automated check-out system, the instructions comprising: processing a plurality of shopping cart transactions, wherein each shopping cart transaction involves a measured total weight of products in a physical shopping cart and an expected total weight of the products in the shopping cart; for each transaction, determining a weight discrepancy between the measured total weight and the expected total weight; analyzing the plurality of transactions to identify transactions with similar weight discrepancies and to identify a common product associated with the transactions having similar weight discrepancies; attributing the identified weight discrepancies to the common product; accessing a data set correlating products and weights, including a pre-stored weight associated with the common product; and updating by the amount of the weight discrepancy, the pre-stored weight of the common product in the data set.

Consistent with the present disclosure, in some embodiments of the automatic weight update feature, the expected total weight of the products in the shopping cart is derived from images of the products captured by a customer using a handheld image sensor.

Consistent with the present disclosure, in some embodiments of the automatic weight update feature, the updated amount of the weight discrepancy is based on an average discrepancy across each of the plurality of shopping cart transactions.

Common Central Server Verifies Carts in Multiple Stores

Rather than having each store set up its own index of product weights, a retailer using a system consistent with this disclosure may verify transactions at a central server. In this way, for example, each time a new product is added or updated, the change may occur on the central server, and multiple stores can benefit (central verification feature).

Consistent with the present disclosure, the central verification feature may involve a system for remotely verifying accuracy of weight-based shopping cart transactions from a plurality of differing retail establishments, the system comprising: at least one server remote from the differing retail establishments and being configured to communicate with the plurality of differing retail establishments, the at least one remote server configured to: maintain an index of products sold at each of the differing retail establishments and a weight associated with each of the products; receive via at a plurality of wireless communication channels from personal mobile communications devices operated by a plurality of shoppers in the plurality of different retail establishments, identities of products in physical shopping carts of each of the plurality of shoppers; calculate an expected weight of products in each physical shopping cart of each of the plurality of shoppers; receive from scales at checkout locations in each of the retail establishments data identifying actual weights of products in each of the plurality of shopping carts; confirm a substantial match between the actual weight of products in at least some of the plurality of shopping carts and the expected weight of products in at least some of the plurality of shopping carts; and based on the confirmed substantial match, transmit to the retail establishment an indication that the verification is complete.

Consistent with the present disclosure, some embodiments of the central verification feature may include adding new products to the index at the at least one server remote from the plurality of retail establishments, to thereby enable a single update to the index to be used in connection with transaction in the plurality of retail establishments.

Consistent with the present disclosure, in some embodiments of the central verification feature, the data identifying actual weights of the products in each of the physical shopping carts includes an identification of a weight of the cart and the products in the cart.

Consistent with the present disclosure, in some embodiments of the central verification feature, each cart in each of the plurality of retail establishments includes a unique identifier, and wherein the at least one server maintains an index each cart identifier and an associated cart weight, and wherein the data identifying actual cart weights includes an indication of the unique identifier.

Consistent with the present disclosure, in some embodiments of the central verification feature, the data identifying actual weights of products in each of the physical shopping carts includes an actual empty cart weight transmitted from each retail establishment to the at least one remote server.

The foregoing description is presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Python, Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A transaction validation system for use in self-checkout at a retail establishment, the system comprising:
   a scale sized to support and weigh a shopping basket thereon;
   at least one image sensor arranged to capture at least one image of the weighed shopping basket in a vicinity of the scale;
   at least one processor configured to:
      receive from the scale a weight measurement of the shopping basket;
      determine, based on information received from a wireless communications device of a customer, a record of products in the shopping basket and an expected cumulative weight associated with the products in the shopping basket;
      determine a discrepancy between the weight measurement of the products in the shopping basket and the expected cumulative weight; and
      reconcile the determined discrepancy using the at least one captured image of the shopping basket by the at least one image sensor.

2. The system of claim 1, wherein reconciling the determined discrepancy includes recommending to the customer, based on the at least one captured image, a product for inclusion in the record.

3. The system of claim 1, wherein reconciling the determined discrepancy includes automatically updating the record with at least one additional product not included in the record and identified through analysis of the at least one captured image.

4. The system of claim 1, wherein reconciling the determined discrepancy is based on historical purchase records of the customer.

5. The system of claim 1, wherein reconciling the determined discrepancy includes:
   accessing historical data to ascertain products previously purchased by the customer;
   comparing the determined discrepancy with a weight of at least one product in the historical data to identify a likely additional product in the shopping basket, wherein the additional product is not initially included in the record;
   outputting a prompt to the customer querying the customer as to whether the likely additional product is in the shopping basket; and
   upon receiving an affirmative response to the prompt by the customer, updating the record to include the likely additional product.

6. The system of claim 1, further comprising a detector adapted to read at least one of a QR code, a bar code, or another computer readable code on the shopping basket for use in determining a pre-recorded weight of the shopping basket and wherein determining the discrepancy further includes accounting for the pre-recorded weight of the shopping basket.

7. The system of claim 1, wherein the at least one processor is further configured to determine a customer identifier associated with the customer, and wherein the at least one processor is further configured to access customer account data using the customer identifier.

8. The system of claim 1, wherein the at least one image sensor includes a top view camera mounted in a position enabling capture of a top view image of the shopping basket.

9. The system of claim 8, wherein the at least one image sensor includes at least one additional camera positioned to capture at least one of a side view image or bottom view image of the shopping basket, and wherein reconciling includes using at least the top view image and at least one of the side view image and the bottom view image to identify at least one product missing from the record.

10. The system of claim 8, further comprising a ramp for guiding the shopping basket onto the scale, and wherein the ramp and the at least one image sensor are coordinatingly arranged such that when the shopping basket is positioned on the scale beyond the ramp, the top view camera is located above the shopping basket.

11. The system of claim 1, wherein the at least one processor is configured to associate with the customer a charge for products determined to be in the shopping basket, where the at least one processor is configured to determine the associated charge based on the use of a set of product images captured by the wireless communications device of the customer, and the at least one image sensor in the vicinity of the scale.

12. The system of claim 1, wherein the wireless communications device includes at least one of a cell phone, a tablet, a code scanner of a sales establishment in which the shopping basket is located, a portable image sensor of a sales establishment in which the shopping basket is located, and a fixedly mounted image sensor associated with at least one of the shopping basket or a shopping aisle.

13. The system of claim 1, wherein the wireless communications device is provided by the customer, and wherein the at least one processor is further configured to receive via a wireless communications channel from the wireless communications device a unique identifier of the shopping basket, in order to electronically pair the customer with the shopping basket.

14. The system of claim 1, wherein the at least one processor is configured to determine the expected cumulative weight by accessing a data set that includes pre-recorded product image data associated with a catalogue of products, and an a weight associated with each product in the catalogue, and wherein the image data identifies each product in the catalogue from a plurality of vantage points.

15. The system of claim 1, wherein the at least one image sensor is located in a store, wherein the at least one processor is configured to determine a discrepancy from a central location remote from the store, and wherein the at least one processor in the central location is adapted to determine discrepancies from a plurality of stores.

16. A non-transitory computer readable medium containing instructions for use in self-checkout at a retail establishment, the computer readable medium containing instructions that when executed by a processor cause the processor to perform a method, the method comprising:
receiving, from a scale, a weight measurement of a shopping basket;
determining, based on information received from a wireless communications device of a customer, a record of products in the shopping basket and an expected cumulative weight associated with the products in the shopping basket;
determine a discrepancy between the weight measurement of the shopping basket and the expected cumulative weight;
receiving, from an image sensor in a vicinity of the scale at least one image of the shopping basket;
performing an image analysis on the at least one image to determine products in the shopping basket; and
reconciling the determined discrepancy using the determined products in the at least one captured image of the shopping basket by identifying in the at least one captured image at least one product missing from the record; and
updating the record with the at least one missing product.

17. The non-transitory computer readable medium of claim 16, wherein the method further comprises recalculating the expected weight of the products in the shopping basket based on the updated record.

18. The non-transitory computer readable medium of claim 16, wherein the method further comprises, prior to updating the record, presenting to the customer a request to confirm that the customer placed the at least one missing product in the shopping basket.

19. The non-transitory computer readable medium of claim 16, wherein the at least one image sensor includes a top view camera mounted above the scale, configured to capture a top view image of the shopping basket.

20. The non-transitory computer readable medium of claim 19, wherein the at least one image sensor further includes at least one of a side view camera configured to capture a side view image of the shopping basket and a bottom view camera configured to capture a bottom view image of the shopping cart, and wherein reconciling includes using at least the top view image and at least one of the side view image and the bottom view image to identify at least one product missing from the record.

* * * * *